United States Patent Office 3,446,645
Patented May 27, 1969

3,446,645
DESICCANT BODIES
Wilfred Drost, Williamsville, N.Y., assignor to Union Carbide Corporation, a corporation of New York
No Drawing. Continuation of application Ser. No. 363,985, Apr. 30, 1964. This application May 6, 1968, Ser. No. 727,089
Int. Cl. B44c 1/06; B01j 11/40
U.S. Cl. 117—26    5 Claims

ABSTRACT OF THE DISCLOSURE

Attrition resistant agglomerates of zeolitic molecular sieve crystals are prepared by first forming an agglomerate of zeolite crystals either alone or in combination with a clay binder, coating the agglomerate with an inert silica-containing mineral, impregnating this coating with an aqueous solution of an alkali metal silicate, and heating the impregnated coated agglomerate to cure and harden the alkali metal silicate and to activate the crystalline zeolitic molecular sieve.

---

This application in a continuation of U.S. application Ser. No. 363,985, filed Apr. 30, 1964, now abandoned.

The present invention relates in general to composite desiccant materials. More particularly the invention relates to hardened agglomerates of crystalline zeolitic molecular sieves and to the process for preparing same.

Crystalline zeolitic molecular sieves occur naturally or are synthesized as fine crystalline bodies which for general utility in commercial adsorptive or catalytic processes are usually formed into agglomerates, preferably possessing as high a degree of attrition resistance and crush strength as possible without unduly affecting the adsorptive properties of the sieve. One method of agglomerating these finely crystalline materials is by combining them with a clay binder as described in United States Patent 2,973,327 issued Feb. 28, 1961 in the name of W. J. Mitchell et al. Whereas this prior technique provides a suitable agglomerate for a wide variety of industrial applications, it has been found that certain applications having a very low tolerance for attrition-produced particles or dust require a more strongly bound molecular sieve agglomerate.

In addition it has been found that under some conditions, halogenated derivatives of ethane and methane employed as refrigerant gases are decomposed to some extent by a number of prior known molecular sieve agglomerates used as desiccants in the system.

It is therefore the general object of this invention to provide a molecular sieve agglomerate having improved resistance toward attrition and dusting, and a novel process for preparing same.

It is a further and more particular object to provide a molecular sieve agglomerate for use as a desiccant in refrigerant systems containing halogenated hydrocarbons whereby decomposition thereof is negligible and the sieve does not undergo significant mechanical breakdown or loss of crystallinity.

In accordance with the present invention, improved, attrition resistant, and in some embodiments chemically compatible, desiccant bodies are prepared by the process which comprises applying to the outer surface of a crystalline zeolitic molecular sieve agglomerate an essentially continuous coating of a finely divided inert silica containing mineral, contacting and impregnating at least the coating of the agglomerate thus formed with an aqueous solution of an alkali metal silicate, drying the silicate impregnated agglomerate to remove a substantial portion of water therein, and thereafter firing the resulting composite agglomerate to set and harden the silicate and activate the molecular sieve.

The structure of crystalline zeolites may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal for cations, for example, alkali metal and alkaline earth metal ions such as sodium, potassium, calcium and magnesium ions. One cation may be exchanged for another by ion-exchange techniques.

These zeolites may be activated to form zeolitic molecular sieves by driving off substantially all of the water of hydration. The space remaining in the crystals after activation is available for adsorption of adsorbate molecules having a size, shape and energy which permits entry of the adsorbate molecules into the pores of the molecular sieves.

Any type of crystalilne zeolitic molecular sieve may be employed in the present method to provide a hardened zeolitic molecular sieve agglomerate according to the invention. The selection of the particular sieve will depend on factors such as the apparent pore size of the material, and the end use of the agglomerate. For example, the pores must be at least large enough to receive the desired adsorbate molecule. In the case of refrigerant drying, the pores are preferably less than about 4.9 angstroms in diameter so as to permit the inclusion of the water molecules and exclude the larger halogenated hydrocarbon molecules. This latter aspect is discussed more fully hereinafter in relation to removal of moisture from halogenated methane and/or ethane-containing refrigerants.

Among the naturally occurring crystalline zeolitic molecular sieves are erionite, chabazite, analcite, faujasite, clinoptilolite and mordenite. The natural materials are adequately described in the chemical art. Synthetic zeolitic molecular sieves include zeolites A, T, X and Y.

Zeolite A is a crystalline zeolitic molecular sieve which may be represented by the formula:

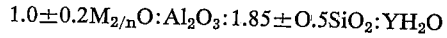

wherein M represents a metal, $n$ is the valence of M, and $y$ may have any value up to about 6. The as-synthesized zeolite A contains primarily sodium ions and is designated sodium zeolite A or zeolite 4A. Zeolite A is described in more detail in U.S. Patent No. 2,882,243, issued April 14, 1959.

Zeolite T is a synthetic crystalline zeolitic molecular sieve whose molar composition may be expressed in terms of oxides as follows:

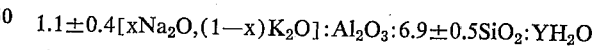

wherein $x$ is any value from about 0.1 to about 0.8 and $y$ is any value from about zero to about 8. Further characterization of zeolite T by means of X-ray diffraction techniques is described in U.S. Patent No. 2,950,952 issued Aug. 30, 1960.

Zeolite X is a synthetic crystalline zeolitic molecular sieve which may be represented by the formula:

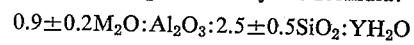

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 angstrom units. Zeolite X, its X-ray diffraction pattern, its properties, and method for its preparation are described in detail in U.S. Patent No. 2,882,244 issued Apr. 14, 1959.

Zeolite Y is a synthetic crystalline zeolitic molecular sieve which may be represented in terms of oxides by the formula:

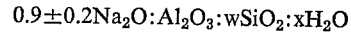

wherein $w$ is a value greater than 3 up to about 6 and $x$ can be a value up to about 9. Detailed characterization of zeolite Y is contained in U.S. Patent No. 3,130,007 issued Apr. 21, 1964 in the name of D. W. Breck.

Since sodium zeolite A as synthesized exhibits a relatively small (although still significant) ability to adsorb halogenated ethanes and methanes in refrigerant systems while retaining a strong ability to adsorb water, agglomerated sodium zeolite A is a preferred starting material for preparing the hardened agglomerates of this invention, particularly where the intended use is in refrigerant systems.

The initial or starting agglomerate of molecular sieve crystals can comprise essentially only the sieve crystals pressed or otherwise compacted so that the agglomerate possesses sufficient handling strength. On the other hand, mixtures or blends of molecular sieve with binder materials such as clay, silicates or both clay and silicates can be employed. Thus prior art agglomerates such as those disclosed in U.S. Patent No. 2,973,327, Mitchell et al., can readily be employed in the present process since the novel composite agglomerate produced in such cases possesses improved strength properties without adverse affect upon adsorption properties. It is in fact preferred that the initial or starting molecular sieve agglomerate be one formed by the blending of clay with molecular sieve crystals.

In preparing such a clay containing starting agglomerate, the clay should be semi-plastic or plastic in the presence of water at atmospheric temperatures and capable of acquiring a substantial "green" strength upon exposure for short periods of time to the drying process of the air. Examples of clays which may be employed for bonding molecular sieves without substantially altering the adsorptive properties of the molecular sieve are attapulgite, kaolin, sepiolite, palygorskite, kalinite, plastic ball clays, clays of the attapulgite or kaolin types, bentonite, montmorillonite, illite, chlorite, and bentonite-type clay. Preferably the clay is one such as attapulgite have a pH (measured in aqueous dispersion) of not more than 8.5 and more preferably not more than 8. Some commercially available clays, because of acid treatment during preparation for the market, have pH values of as low as about 5.5. The slightly acid character of these clays has been found to be somewhat beneficial to the present process.

The amount of clay with respect to molecular sieve in the preferred starting agglomerate depends primarily upon the degree of dilution of the molecular sieve permissible in a desired use of the final product. For most purposes a clay content of from 5% to 35% by weight of the final product is satisfactory.

Having provided an initial molecular sieve agglomerate, the essential second step of the present process is accomplished by applying to the surface of the said agglomerate a relatively thin coating of a finely divided inert silica-containing mineral. This coating material is preferably clay or powdered asbestos, but can be any inert relatively hard mineral such as powdered mica, finely ground quartz, conventional siliceous materials such as frits, enamels, and the like. Although the average particle size of the coating material is not narrowly critical, it has been found that particles having a mesh of greater than about 300 and preferably greater than about 350 mesh (U.S. Standard Sieve) give optimum results. Larger particles can be suitably employed provided the method of contacting the coating material with the starting molecular sieve agglomerate involves sufficient mechanical force to further reduce the particle size of the coating material.

Of the suitable coating materials finely divided clay and asbestos are highly preferred. Illustrative of the clays are attapulgite, kaolin, sepiolite, palygorskite, kaolinite, plastic ball clays, clays of the attapulgite or kaolin types, bentonite, montmorillonite, illite, chlorite, and bentonite-type clays. Attapulgite and attapulgite-type clays are particularly suitable. Similarly several varieties of asbestos are known and all have been found suitable for use as the coating material after reduction to powder form.

In applying the coating material to the starting agglomerate it is essential that the particles of coating form a densely compacted surface over all or substantially all of the agglomerate. Tumbling of the agglomerates in admixture with the coating particles in an apparatus having a "cement-mixer" type of rotational action has been found to be quite suitable. Other obvious means can of course be employed such as spraying the agglomerates with a slurry or dispersion of the coating particles in a liquid dispersant inert to the coating and the molecular sieve agglomerate and which is sufficiently volatile to be readily removed from the coated agglomerate. Water is a quite suitable dispersing medium for this technique.

It has been found that very thin coatings of clay or other inert mineral material are adequate, thus causing a minimum of dilution of the molecular sieve content of the final product. Coatings of at least about 1 micron thickness are usually required, with about 0.00025 inch coating thicknesses being preferred. Coatings having thicknesses above about 0.003 inch do not in general contribute any more to the improvement in attrition-resistance than those less than 0.003 inch, but if desired, can be employed. With very thick coatings some undesirable chipping of the final product due to differences in expansion properties of the central molecular sieve agglomerate and the outer coating may be observed.

After the coating has been applied the resulting coated agglomerates are thereafter contacted with an aqueous solution of an alkali metal silicate. For reasons of economy, primarily, potassium and sodium silicates are preferred, but lithium, rubidium and cesium silicates can suitable be employed. In the instance in which the molecular sieve employed is all or predominantly sodium zeolite A, potassium silicate is especially preferred, particularly where the final product is to be utilized as a halogenated hydrocarbon refrigerant system desiccant.

The alkali metal silicate solution may vary in its ratio of alkali metal oxide to silicon dioxide throughout the entire range of solubility. The presence of colloidal silica in suspension in the impregnating solution is not detrimental but has not been found to materially improve the product. Solutions containing alkali metal oxide to silicon dioxide ratios of 0.31 to 0.63 have been used with excellent results. Ratios lower than about 0.27 may be used but are not preferred because they tend to have increasing amounts of the silicon dioxide present in undissolved form.

The solid content of the silicate solution which is the sum of weight percent of the alkali metal oxide and the silicon dioxide in the solution may be from about 3 to about 35 weight percent. Lower than about 3% will not provide a sufficient introduction of silicate into the agglomerate to materially improve the crush strength, while more than about 35% leads to loss of absorption capacity of the contained molecular sieve.

Within the above ranges of ratio of oxides and solid contents of the solution, the quantity of solution employed to impregnate a quantity of molecular sieve agglomerate may be in the range to provide 0.07 to 0.73 pound of solution solid per pound of agglomerate.

The contact or soaking of the agglomerates in the silicate solution may be either batch-type or continuous. When batchwise contact is employed it is desirable to provide agitation for uniformity. Such agitation may be conducted by stirring the solution with moderation, to avoid breaking up the agglomerates.

Continuous contact is conveniently accomplished by percolating the solution through a chamber containing the agglomerates. In the continuous contact method the concentration of the solids in the silicate solution may be in the lower concentration range and the solution can be replenished as the solids are depleted.

The immersion may be hot or cold, the advantage of heat being that shorter contact time may be employed but the disadvantage is the increased tendency toward alkali attack on the crystal structure of the zeolitic molecular sieve. Temperatures below about 60° C. are to be preferred to reduce this attack particularly when the alkali metal oxide to silicon dioxide ratio is high.

The amount of silicate impregnated into the agglomerates is affected by all of the variables in the instant method and the time of contact. In some instances when using concentrated treating solutions, elevated temperatures, and very porous agglomerates, an immersion time of a few minutes is satisfactory. Longer contact times will generally result in an increase in the quantity of silicate entering the agglomerate and the distance of penetration of the silicate into the agglomerate. The time may extend to several hours or even several days, if desired, provided that the integrity of the agglomerate or the molecular sieve crystal is not affected. Increase in either or both the concentration and distance of the penetration will increase the final crush resistance of the product.

It is readily seen that by employing short immersion times in the practice of this invention, one can make a product having a hardened, abrasion-resistant exterior on the agglomerates which is entirely satisfactory for applications where this property is desired. On the other hand, longer contact times will effect a somewhat deeper hardening, which is preferred for maximum crushing resistance.

Following the immersion step the agglomerates are separated from the treating solution and may, if desired, be given a brief water rinse which will remove just enough of the solution adhering to the outer surface of the agglomerates to eliminate the tendency of the agglomerates to adhere to each other.

After the agglomerates have been separated from the impregnation solution they may be fired. However, it is preferred to give them an intermediate drying to reduce their moisture content to the range of 15 to 22 weight percent. This drying may for example be done by air-blowing and can be aided by moderate heating in the temperature range of 180° to 350° F. This drying serves to substantially remove the intracrystalline water thus reducing the heating load and steaming in the firing step.

The firing step completes the setting of the binder and at the same time removes the intracrystalline water of the crystalline molecular sieve, thereby activating it for adsorbent use. The firing may be done for example in a ventilated or forced-flow purge kiln to sweep out the evolved water vapor. The firing temperature required to set the binder and to activate the molecular sieve is in general within the range of about 1050° F. to 1220° F. By activation is meant driving off substantially all of the water of hydration of the molecular sieve crystals leaving the internal pores of the sieve free to accept adsorbate molecules. The setting of the binder only without activation of the molecular sieve requires a temperature of about 650° F.

The surprising improvement in the wet attrition resistance of the desiccant bodies of the present invention is not readily attributed to any single factor. Rather it would appear to result from a "synergistic" interaction between the alkali metal silicate and the inert mineral coating material even though no strictly chemical reaction between the two materials can be formulated on the basis of the present state of the art. It is however apparent that the mineral coating, even though very thin permits or causes a degree of hardening of the alkali metal silicate which is not possible when the same materials are all intimately admixed, i.e., no coating is present.

In the examples set forth hereinafter the following experimental test procedures were performed on samples of the composite desiccant bodies of this invention:

(I) Wet attrition

A. Frigidaire wet attrition test.—This test measures both the wet attrition and the impact strength of the bodies. In accordance with the procedure, 100 ml. of desiccant beads are placed in a cylindrical 118-ml. glass container having dimensions 5.25 cm. in diameter and 6.35 cm. in height and provided with a tight-fitting closure. Trichloroethylene (50 ml.) is added to the desiccant beads and the closed container is subjected to a vertical reciprocating motion having an amplitude of 4.44 cm. and a frequency of 330 cycles per minute for 22.5 hours. The fines produced by attrition are thereafter washed from the beads with the trichloroethylene through a No. 100 U.S. Standard Sieve into a beaker, isolated from the trichloroethylene, heated to 350° C. to activate the sieve, and weighed. The weight obtained, expressed as a weight percent of the initial charge of desiccant beads is taken as the measure of the wet attrition strength.

B. Paint shaker wet attrition test.—This test measures principally attrition wet strength. In accordance with the procedure 136 ml. of desiccant beads are placed in a cylindrical 150-ml. container having a diameter of 4.4 cm. and a height of 10 cm. Sixty-eight ml. of trichloroethylene are added, the container closed, and subjected to a high frequency swirling motion in a model No. 30 Red-Devil Paint Conditioner (manufactured by Red Devil Tools, Union, N.J.) for 30 minutes. The fines produced by attrition are measured as described hereinbefore in the Frigidaire wet attrition test.

(II) Zig-zag test

This test gives a measure of the resistance of the desiccant beads to attritive forces involved in repeatedly air-lifting the beads through a 2.75 meter long zig-zag path in a 5.1 cm. diameter glass tube. The air velocity is established slightly higher than that required for fluidization of the charge. The loss of fines through a No. 40 U.S. Standard Sieve after 2000 cycles based on the weight of the initial charge gives the percent zig-zag loss.

EXAMPLE I

Sodium zeolite A (4A) "green" (i.e. unfired) spheres or "beads" (size 8 x 12 mesh) containing 20 weight percent attapulgus clay binder were prepared on a production scale according to the procedures described in U.S. Patent 2,973,327 to Mitchell et al. According to these procedures, spherical agglomerates were formed by first dry-blending powders of Type 4A molecular sieve (four parts by weight) and attapulgus clay (1 part by weight), then combining controlled amounts of water with this blend in a rotating-drum device. The spheroidal bodies were then formed by tumbling. A quantity of these spheres (7505 grams) having a moisture content of 33.7 weight percent $H_2O$ were tumbled in a horizontally-rotating drum resembling in principle the action of a cement mixer for 5 minutes while being sprayed with a fine mist of water. The moisture content at this point was 34.8 weight percent. Onto these damp agglomerates was uniformly sifted 120 grams of a powdered refined attapulgus clay over a five-minute period. Tumbling of the coated beads then continued for an additional ten minutes. The beads were then impregnated with potassium silicate by soaking for 2 hours at room temperature in 36.5 lb. of a solution comprising 2 parts of potassium silicate (8.30 weight percent $K_2O$ and 20.80 weight percent $SiO_2$) and 1 part of water. The soaked agglomerates were drained for 30 minutes; at this point their moisture was 33.1 weight percent $H_2O$. A 12-oz. portion of this batch was transferred to a Teflon-lined gallon can in which the beads were pre-dried by tumbling at room temperature, oven dried at 90° C. for about 1 hour, hand-tumbled in a gallon can, screened and fired for 40 minutes at 500° C. in air. The wet-attrition losses for this sample, as determined by the Frigidaire test method described hereinabove, were 0.2 and 0.3 weight percent (two determinations). When measured by the Paint Shaker wet attrition test method, the loss was found to be zero. The standard water adsorption tests on the product showed that its water capacity was substantially unchanged from that exhibited by untreated fired 4A beads.

EXAMPLE II

Sodium zeolite A "green" (i.e. unfired) beads (size 8 x 12 mesh) containing 20 weight-percent attapulgus clay binder were prepared according to the procedures described in U.S. Patent 2,973,327 to Mitchell et al. According to these procedures, spherical agglomerates were formed by first dry-blending powders of Type 4A molecular sieve (four parts by weight) and attapulgus clay (1 part by weight), then combining controlled amounts of water with this blend in a rotating-drum device. The spheroidal bodies were then formed by tumbling. A quantity of these spheres (910 grams) having a moisture content of 32.5 weight-percent $H_2O$ were tumbled in a rotating-drum mixer for 5 minutes while being sprayed with a fine mist of water. Tumbling continued for 15 minutes. Powdered asbestos (27 grams) was uniformly sifted onto the damp agglomerates over a 3-minute period, followed by an additional tumbling period of 10 minutes. The coated beads were then soaked for 2 hours in 8 lb. of a potassium silicate solution as in Example I. The soaked agglomerates were drained for 30 minutes, dried and fired as in Example I. Wet attrition losses on the product were determined by the Frigidaire test method and found to be 0.5 and 0.6 weight-percent (two determinations). When measured by the Paint Shaker wet attrition test method, the loss was 0.2 weight-percent.

EXAMPLE III

Using the same procedure as in Example II, 1865 grams of green attapulgus clay-bonded 8 x 12 mesh beads were treated. The powderous coating applied to these agglomerates comprised 30 grams of another type of purified attapulgus clay of an essentially neutral nature. Wet attrition losses, as determined on the fired product by the Frigidaire and Paint Shaker methods, were found to be 0.6 weight-percent and 0.2 weight-percent, respectively.

EXAMPLE IV

The desiccant beads prepared in accordance with the procedure of Example I were employed in an activated state in intimate contact with monochlorodifluoromethane to determine the degree of decomposition of a halogenated hydrocarbon refrigerant resulting from contact with the desiccant. The procedure used is described by Spauschus and Olsen ("Gas Analysis—A New Tool for Determining the Chemical Stability of Hermetic Systems," Refrigerating Engineering, February 1959, pp. 25–29) involving measurement of the non-condensable gas, largely carbon monoxide, formed as a product of decomposition. The following data, indicating negligible decomposition of the refrigerant was obtained.

Non-condensable gas formed after 6 weeks, ml. gas/gm. desiccant _____ 0.22
Chloride in desiccant after 6 weeks, gm/gm. desiccant _____ 0.001
Chloride found in refrigerant after 6 weeks _____ 0

What is claimed is:

1. The method for preparing an attrition-resistant composite adsorbent body which comprises applying to the outer surface of a crystalline zeolitic molecular sieve agglomerate core an essentially continuous porous coating consisting essentially of a finely divided inert silica-containing mineral and thereafter contacting and impregnating the coated agglomerate thus formed with an aqueous solution of an alkali metal silicate and heating the resulting impregnated coated agglomerate to a temperature sufficient to cure and harden the alkali metal silicate and activate the crystalline zeolitic molecular sieve.

2. The method according to claim 1 wherein the crystalline zeolitic molecular sieve is zeolite A.

3. The method according to claim 1 wherein the inert silica-containing mineral coating is selected from the class consisting of clay and asbestos and is from about 0.00025 inch to 0.003 inch.

4. The method according to claim 1 in which the alkali metal silicate is potassium silicate.

5. The method according to claim 1 wherein the crystalline zeolitic molecular sieve core comprises an intimate blend of from about 95 to about 65 parts by weight crystalline zeolite A and from about 5 to about 35 parts by weight attapulgite clay, the inert silica-containing mineral is attapulgus clay and the alkali metal silicate is potassium silicate.

References Cited

UNITED STATES PATENTS

| | | | |
|---|---|---|---|
| 1,421,888 | 7/1922 | Allen | 117—70 |
| 1,857,496 | 5/1932 | Clapp | 117—70 |
| 2,163,678 | 6/1939 | Gundlach | 117—70 |
| 2,354,351 | 7/1944 | Schuetz | 117—70 |
| 2,372,285 | 3/1945 | Marc et al. | 117—70 |
| 2,549,516 | 4/1951 | Parry | 117—70 |
| 2,885,368 | 5/1959 | Hess et al. | 252—449 X |
| 2,973,327 | 2/1961 | Mitchell et al. | 252—449 |
| 2,981,636 | 4/1961 | Lodge et al. | 117—70 |
| 3,013,893 | 12/1961 | Olson et al. | 117—70 |
| 3,036,929 | 5/1962 | Kawashima et al. | 117—70 |
| 3,055,841 | 9/1962 | Gladrow et al. | 252—455 |
| 3,208,871 | 9/1965 | Langseth et al. | 117—70 X |

WILLIAM D. MARTIN, *Primary Examiner.*

E. J. CABIC, *Assistant Examiner.*

U.S. Cl. X.R.

117—70, 100; 55—389; 252—455